United States Patent
Sauler et al.

(10) Patent No.: US 6,975,969 B2
(45) Date of Patent: Dec. 13, 2005

(54) DEVICE FOR ERROR RECOGNITION IN A DIGITAL SIGNAL EVALUATION UNIT

(75) Inventors: Juergen Sauler, Stuttgart (DE); Oskar Torno, Schwieberdingen (DE); Axel Heinstein, Rudersberg (DE); Carsten Kluth, Stuttgart (DE); Werner Haeming, Neudenau (DE)

(73) Assignee: Robert Bosch GmbH, Stuttgart (DE)

( * ) Notice: Subject to any disclaimer, the term of this patent is extended or adjusted under 35 U.S.C. 154(b) by 103 days.

(21) Appl. No.: 10/275,605

(22) PCT Filed: May 4, 2001

(86) PCT No.: PCT/DE01/01700

§ 371 (c)(1),
(2), (4) Date: Nov. 7, 2002

(87) PCT Pub. No.: WO01/86231

PCT Pub. Date: Nov. 15, 2001

(65) Prior Publication Data

US 2003/0127071 A1 Jul. 10, 2003

(30) Foreign Application Priority Data

May 10, 2000 (DE) .......................... 100 22 815

(51) Int. Cl.$^7$ ............................. G01M 19/00; F02P 5/00
(52) U.S. Cl. ................... 702/189; 702/185; 73/35.04; 701/111
(58) Field of Search .................. 702/33–36, 38–40, 702/57–59, 87, 88, 113–115, 117–120, 182–183, 189–191, 193; 73/35.09, 35.11–35.13, 35.01, 35.04; 707/29, 31, 111; 375/224, 226, 227; 714/48

(56) References Cited

U.S. PATENT DOCUMENTS

| | | | |
|---|---|---|---|
| 4,208,625 A | 6/1980 | Piso | 324/671 |
| 4,251,769 A | 2/1981 | Ewert | 324/96 |
| 4,254,469 A * | 3/1981 | Whitely | 702/87 |
| 4,338,589 A | 7/1982 | Engel et al. | 341/120 |
| 4,593,553 A | 6/1986 | Bonitz et al. | 62/140 |
| 4,821,194 A * | 4/1989 | Kawamura | 701/111 |
| 4,943,807 A | 7/1990 | Early et al. | 341/120 |
| 5,490,091 A * | 2/1996 | Kogan et al. | 702/180 |
| 5,522,254 A | 6/1996 | Kamabora | 73/35.05 |
| 5,726,888 A * | 3/1998 | Hornback | 701/34 |
| 5,822,706 A | 10/1998 | Pfeufer et al. | 701/29 |
| 6,226,576 B1 * | 5/2001 | Torno et al. | 701/34 |

FOREIGN PATENT DOCUMENTS

| | | |
|---|---|---|
| DE | 40 15 042 | 11/1991 |
| DE | 44 04 999 A1 | 8/1995 |
| DE | 196 35 440 A | 3/1998 |
| DE | 197 01 110 A1 | 7/1998 |
| DE | 197 56 081 A | 6/1999 |
| DE | 100 04 166 A1 | 8/2001 |
| EP | 0 718 611 A1 | 6/1996 |
| JP | 60203846 A | 10/1985 |
| WO | WO 9931476 A2 * | 6/1999 ........... G01L/23/00 |

* cited by examiner

Primary Examiner—Marc S. Hoff
Assistant Examiner—Manuel L. Barbee
(74) Attorney, Agent, or Firm—Michael J. Striker

(57) ABSTRACT

A device for signal evaluation is described, in particular for knock recognition in an internal combustion engine, in which the signals forwarded by sensors are evaluated digitally and error recognition is carried out that performs two different test functions, whereby a first test function supplies a test pulse at a specifiable location, and the second test function clears the sensor signals, and the reaction of both the analog and digital parts of the circuit are monitored.

9 Claims, 1 Drawing Sheet

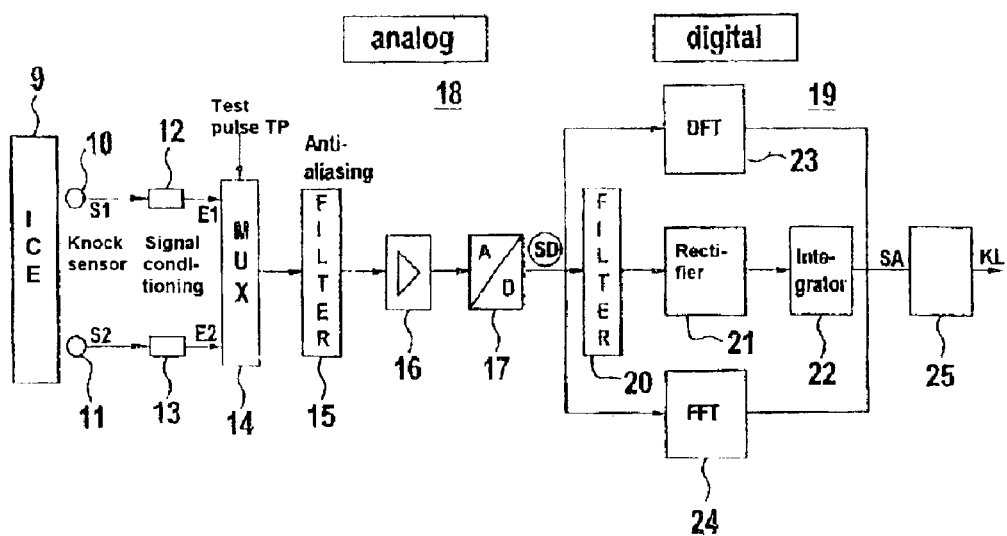

DEVICE FOR ERROR RECOGNITION IN A DIGITAL SIGNAL EVALUATION UNIT

BACKGROUND OF THE INVENTION

The present invention relates to a device for error detection in a digital signal evaluation unit.

It is known that, in signal evaluation units designed as analog evaluation IC's, for example, monitoring measures are required that allow misoperations to be recognized. Various possibilities for accomplishing this are known. For example, a method for monitoring and error recognition is presented in DE-P 197 560 81.4 that is carried out in an analog evaluation IC in conjunction with knock detection in an internal combustion engine. With this knock detection, the structure-borne noise signals supplied by the knock sensors are forwarded to the evaluation IC via a multiplexer. This IC is composed, at the least, of an amplifier, a filter, a rectifier, and an integrator. The resultant integrator result is used as the result of knock detection in order to calculate a knock index for the knock control. Signal evaluation takes place in this IC in analog form. Two test options are implemented to monitor the operatability of the integrated circuit (IC). These test options are referred to as test pulse and zero test. Using this type of diagnosis, the entire signal path except for the multiplexer can be checked for operatability.

In the first test option—the test pulse—a test signal is supplied to the evaluation chain after the multiplexer. The downstream integrator is fully modulated by means of this signal in a relatively short period of time, independently of the amplifier level setting. If it is recognized that the expected full modulation of the integrator has not occurred after a relatively short period of time, an error is detected. In the second test option—the O-test—the signal path is separated after the multiplexer. In this case, only the disturbing noises, e.g., background noises, occurring internally in the integrated circuit (IC) are integrated in the integrator.

The signal available in the integrator then provides information as to whether erroneous disturbances have occurred, or if any other misoperations are present. The integrated circuit for evaluation of knock signals in an internal combustion engine must be monitored, since, if the evaluation circuit would fail, erroneous values for knock control would be provided and the knock control itself would no longer function correctly, and damage could occur to the internal combustion engine.

New units for signal evaluation, e.g., in conjunction with knock detection in internal combustion engines, have digital evaluation IC's. The entire signal evaluation, if possible, is thereby performed with the aid of a digital arithmetic and logic unit. Such an evaluation IC designed to evaluate the output signals of knock sensors is described in patent application DE-P 100 041 66.3. In this type of digital signal evaluation, a typical property, e.g., components typical for knock, are extracted from the conditioned and digitized output signals from the sensors, and they are compared with specifiable threshold values for knock detection. A checking or monitoring of the operatability of the IC is not performed in this digital signal evaluation described in DE-P 100 041 66.3.

SUMMARY OF THE INVENTION

The object of the invention is to perform reliable error detection in a digital signal evaluation, e.g., knock detection, with a digital evaluation IC, whereby the errors that may occur in the entire evaluation path of the digital evaluation IC should be reliably detected.

The device, according to the invention, for error detection in a digital signal evaluation has the advantage that errors and/or misoperations are reliably detected and that the flexible adaptations made possible with the digital realization of the signal evaluation unit can be retained. Using the proposed diagnoses, it is possible to monitor the digital and analog parts of the entire evaluation unit, in particular those of the evaluation IC.

These advantages are attained by means of a device for error recognition in a digital signal evaluation, in which two test functions are evaluated for error recognition, and the reaction of the evaluation unit to these test functions is checked.

Further advantages of the invention are attained by means of the measures indicated in the dependent claims. Particularly advantageous for their use in conjunction with knock detection in an internal combustion engine is the fact that the control logic for the method according to the invention is advantageously implemented in the computer of the electronic control unit of the internal combustion engine.

BRIEF DESCRIPTION OF THE DRAWINGS

An exemplary embodiment of the invention is presented in the sole FIGURE in the drawing, and it is explained in greater detail in the subsequent description.

DESCRIPTION OF THE PREFERRED EMBODIMENTS

The exemplary embodiment of the invention presented in the FIGURE is shown as an example of the evaluation of output signals from two knock sensors 10 and 11, each of which is associated with one cylinder of a not-further-shown internal combustion engine 9. Each of the output signals S1 and S2 of the knock sensors 10 and 11 is forwarded to a signal conditioning circuit 12, 13, where they are conditioned by said signal conditioning circuit in such a fashion that they can be forwarded by the multiplexer 14 in a specifiable fashion.

The multiplexer 14 and a filter 15, e.g., an antialiasing filter, a downstream amplifier 16, and an analog/digital converter 17 form the analog part 18 of the initial conditioning of input signals. The actual initial conditioning of input signals takes place in the digital part 19, which is adjacent to the analog part. For this purpose, the signal—which is a digital signal, not shown in drawing SD—supplied by the analog/digital converter 17 is forwarded to the digital part 19.

The digital signal evaluation and/or the digital part 19 are presented as examples for three different exemplary embodiments. On the one hand, the digital part 19 can include a filter 20, a rectifier 21, and an integrator 22, or it can include means for performing a discrete Fourier transformation 23, or means for performing a fast Fourier transformation (FFT) 24. Which one of the signal evaluations performed depends on specifiable particularities and can be adapted to the available signals SD, or they can be selected in project-specific fashion. The evaluation signal SA that includes the knock indices occurs at the outlet of the digital signal evaluation 19. Based on these knock indices, knocks are then recognized in block 25, e.g., a comparing element. Block 25 can also be a controller of the electronic control unit of the internal combustion engine that requires the knock detection to influence certain variables of the internal combustion engine, such as ignition. In general, the entire device for knock detection can also be a component of the electronic control unit of the internal combustion engine.

With the exemplary embodiment presented in the figure for signal evaluation, a plurality of knock sensors 10, 11 can be connected to a multiplexer 14 via symmetrical input circuit elements. The multiplexer always connects only that knock sensor that best recognized the combustion taking place. The output signal from the multiplexer 14 is then forwarded to the analog/digital converter 17 via the filter 15, e.g., an antialiasing filter and, if applicable, via an amplifier 16 as well. Once the signal SD is present in digital form at the outlet of the analog/digital filter 17, the actual digital signal evaluation can take place. This direct signal evaluation, which takes place in the digital block 19, typically contains an energy evaluation. In place of an energy evaluation, a peak value determination could also be carried out for the subsequent knock detection.

A possible method for energy evaluation that is already known in conjunction with an analog circuit described in DE-P 197 560 81.4, consists of filtering the signal from the knock sensor, rectifying or squaring the filtered signal and then integrating the signal. As an alternative, a discrete Fourier transformation (DFT) or a fast Fourier transformation (FFT) could be carried out. Each of the three evaluation methods named makes it possible to evaluate a plurality of frequency ranges and suppress any interference frequencies that are present. As the result of this evaluation, one or more knock indices are then available per combustion in one cylinder of the internal combustion engine. Knock is detected when this knock index or these knock indices exceed certain specifiable and, if applicable, adaptable thresholds. For example, a reference value for knock-free operation can also be taken into account in this comparison. Such a reference value can always be obtained with the same evaluation unit when it is ensured that knock-free operation is present. Knock-free operation occurs under known operating conditions of the internal combustion engine. Since the knock detection according to the invention is used in conjunction with an electronic control unit for the internal combustion engine that recognizes these operating conditions, it is possible to determine the knock values ikr as well as the reference values rkr from the signals SA.

Based on the common abbreviations for:

| Knock value | ikr |
| Reference value | rkr |
| Knock-detection threshold | ke | knock is detected when the following applies:

ikr/rkr>ke

The above-named condition for knock detection, which is checked in circuit part 25, for example, is also used in conventional knock-detection systems. In contrast to the conventional systems, however, signal evaluation and the essential initial conditioning of input signals is carried out as digital signal evaluation in the described means of attaining the object of the invention. Knock value, reference value, and knock-detection threshold are all digital values, so that digitization of the signal SA is therefore eliminated.

The signal evaluation takes place in various frequency ranges, whereby the selection of frequency ranges takes place in such a fashion that the frequency ranges with a high knock signal portion are preferred, and those with a high interference portion (interference frequencies) are suppressed. The knock values ikr determined for individual frequencies represent knock indices that, in the end, are evaluated for knock detection.

According to the invention, a monitoring function that performs two different tests is used for a digital evaluation unit or a digital evaluation IC that is developed and functions in the manner described. The monitoring can take place during specifiable monitoring phases. The monitoring phases are specified, for example, in such a fashion that they are activated immediately after the internal combustion engine is powered-on. It is also possible to schedule the monitoring phases in such a fashion that they take place under operating conditions at which knocking is not expected to occur.

To perform the monitoring, the IC can be operated in two test modes. In the first test mode—which is also referred to as test pulse—a test signal is supplied at the multiplexer 14. The test signal can thereby be provided at an available inlet of the multiplexer 14, or at an additional inlet that is used only for the test. A filter from the RAM or a filter from a test ROM can be used as the filter for the signal coming from the multiplexer 14. The test signal is designed so that, when amplification is greatest, the integrator is modulated as far as possible. The modulation of the integrator 22 also depends on the filter used and the length of the measurement window. The length of the measurement window is the duration of the test signal, for example.

The test signal and/or a test pulse TP is self-generated in the evaluation circuit, to the extent possible, but, in one possible embodiment, it could also be supplied from the outside. The IC is alright when the integrator exceeds a specifiable value. In order to recognize that the IC is alright, the value of the integrator is compared with a threshold value after a specifiable period of time, for example, whereby this comparison can take place using a comparator or a comparison operation in the computer. If the integrator value exceeds the threshold value, the IC is recognized as being alright. If the integrator value does not exceed the threshold value, however, a display can be triggered and/or knock control can be engaged and, if applicable, a switch can be made to emergency operation of the knock control.

In a second test mode—referred to as the zero test—the input signal is cleared at the multiplexer 14, i.e., a signal is not supplied to the evaluation circuit. In addition to the clearing of the signals the two inputs of E1 and E2 at the multiplexer 14 can be short-circuit. The two in puts of one sensor are therefore short-circuited as well. A filter from the RAM or the test ROM can be used again as the filter for the signal coming from the multiplexer. The IC is alright when the integrator result lies below a specifiable threshold value. The comparison of the integrator contents with this second threshold value is carried out with the aid of a comparing element (comparator or computer function). If an error is detected, a display can be triggered and/or the knock control can be engaged. The selection of the threshold values can take place with reference to expected integrator values and varied if necessary.

The zero test can also be used to perform an offset correction when the interference is too great, in the analog signal path in particular. The integrator value and/or contents determined in the zero test are then taken into account in the specification of the zero point of the digital evaluation circuit.

Both the digital and the analog part of the evaluation unit can be checked using the two diagnostic methods. It is thereby determined whether the integrated circuit IC of the evaluation unit functions correctly. Although the location at which the error occurs (multiplexer 14, amplifier 16, etc.) cannot be determined, this is not required, since the information as to whether the IC is fully functional or not is sufficient to ensure reliable knock detection and, therefore, reliable knock control.

The execution of the individual test functions is controlled by means, e.g., by the computer of the electronic control unit, that make it possible to activate the test functions only at specifiable times and/or if specifiable conditions exist. The monitoring can thereby be carried out during on-going operation, for example, under specifiable conditions, or in the initialization phase and/or in after-run. Recognized errors are displayed and/or saved in fault storage.

The invention was described with reference to fault monitoring in the case of a digital evaluation IC for knock detection, but it can also be used with other digital IC's. This invention can also be used in digital signal evaluation that is not used (implemented) in a separate IC, but rather directly in a computer of an electronic control unit, e.g., an electronic control unit for an internal combustion engine.

What is claimed is:

1. A device for signal evaluation, comprising:
    at least one knock sensor for generating a knock signal of an internal combustion engine;
    an analog part receiving the knock signal from the at least one knock sensor and generating a filtered and magnified knock signal without integration;
    an analog/digital converter receiving the filtered and magnified knock signal without integration from the analog part and generating a digital knock signal without integration;
    a digital part receiving the digital knock signal without integration from the analog/digital converter and generating a knock index, wherein by comparison of the knock index with a threshold, knocking in the internal combustion engine can be recognized; and
    error recognition means performing two different test functions, each of the two different test functions testing the analog and the digital part.

2. The device for signal evaluation according to claim 1, wherein the device for signal evaluation has symmetrical inputs to which the sensor or sensors are connected.

3. The device for signal evaluation according to claim 1, further comprising a multiplexer (14) and an integrator (22), wherein the multiplexer is disposed at an inlet with which the sensors are interconnected, and wherein, in a first test, a test signal (TP) is supplied at the multiplexer (14) that is selected in such fashion that the test signal results in a large modulation at the integrator (22), and wherein the integrator (22) is a component of the digital part, that receives the digital knock signal and generates the to knock index.

4. The device for signal evaluation according to claim 3, wherein the test signal (TP) is self-generated in the evaluation circuit.

5. The device for signal evaluation according to claim 1, wherein the test signal (TP) is supplied to the evaluation circuit from the outside.

6. The device for signal evaluation according to claim 1, further comprising a multiplexer (14) and an integrator (22) wherein, to perform a zero test, inputs at the multiplexer (14) are cleared and/or short-circuited, and an integrator value at then occurs at the integrator (22) is compared with a specifiable value, and an error is detected when a specifiable value is exceeded, and wherein the integrator (22) is a component of the digital part, that receives the digital knock signal and generates the knock index.

7. The device for signal evaluation according to claim 6, wherein the result of the zero test is taken into account for offset compensation.

8. The device for signal evaluation according to claim 1, wherein means are available that activate the test functions only at specifiable times and/or when specifiable operating conditions exist.

9. The device for signal evaluation according to claim 8, wherein the means activate monitoring during operation or at specifiable operating points or in the initialization phase and/or in after-run.

* * * * *